US005932864A

United States Patent [19]

Kawabuchi et al.

[11] Patent Number: 5,932,864

[45] Date of Patent: Aug. 3, 1999

[54] AUTOMATED DOCUMENT FEEDER

[75] Inventors: Yoichi Kawabuchi; Eiichi Yoshida; Eiichiro Kawasaki, all of Toyokawa; Yoshikazu Ikenoue, Toyohashi, all of Japan

[73] Assignee: Minolta Co., Ltd., Osaka, Japan

[21] Appl. No.: 08/947,744

[22] Filed: Oct. 9, 1997

[30] Foreign Application Priority Data

Mar. 10, 1997 [JP] Japan .................................... 9-074444

[51] Int. Cl.[6] .................................................... G06K 13/00

[52] U.S. Cl. ........................................... 235/475; 235/479

[58] Field of Search .................................... 235/475, 478, 235/477, 479, 480, 481, 482, 483, 486

[56] References Cited

U.S. PATENT DOCUMENTS 4,520,977 6/1985 Holzhauser et al. .................... 248/201
4,674,862 6/1987 Abuyama .................................. 355/14
4,714,946 12/1987 Bajgert et al. ............................ 355/75
4,849,788 7/1989 Prebola ................................... 355/317
5,347,352 9/1994 Morigami et al. ....................... 355/231
5,419,542 5/1995 Yamada et al. .......................... 271/3.1
5,662,321 9/1997 Borostyan et al. .................. 271/10.03
5,730,571 3/1998 Rinaudo .................................... 412/34
5,784,680 7/1998 Taruki .................................... 399/374

FOREIGN PATENT DOCUMENTS 5-142891 6/1993 Japan .
5-188689 7/1993 Japan .

*Primary Examiner*—Thien Minh Le
*Attorney, Agent, or Firm*—Burns, Doane, Swecker & Mathis, LLP

[57] ABSTRACT

An automated document feeder for use with an image forming apparatus such as copy machine comprises a document feeder for feeding the document and a document support for supporting the document. The document support can occupy any one of three positions; a first position where the document on the document support is kept away from the document feeder, a second position where the document on the document support is in contact with the document feeder, and a third position where the document is out of contact with the document feeder but closer to the document feeder than the document at the first position.

21 Claims, 11 Drawing Sheets

AUTOMATED DOCUMENT FEEDER

BACKGROUND OF THE INVENTION

The present invention relates to an automated document feeder (ADF) for use with an image forming apparatus such as copy machine to feed documents onto a transparent glass or platen of the copy machine and then discharging the same therefrom.

Japanese Patent Laid-Open Publication (Tokkaihei) No. 4-235836 discloses an automated document feeder which includes a document support for supporting a stack of documents, a feed roller disposed above the document tray and a lifting plate for lifting the documents on the document support to bring the topmost document into contact with the feed roller, thereby upon rotation of the feed roller the topmost document is fed out from the document support.

To facilitate the users to set, re-set and add documents on the document support and to remove the same therefrom, the conventional automated document feeder is so designed that the lifting plate normally occupies a lowered position to keep the documents out of contact with the feed roller and, once an instruction is made from a start switch to feed the document, the lifting plate moves up to bring the topmost document into contact with the feed roller. However, the conventional lifting movement of the documents takes a longer time, which delays the beginning of the document feeding.

SUMMARY OF THE INVENTION

Accordingly, the primary object of the invention is to provide an automated document feeder that that takes less time from the instruction of document feeding to the actual feeding of the document, thereby providing an efficient document feeding, and to provide an automated document feeder that allows the documents to be set on or withdrawn from the document support.

An automated document feeder for use with an image forming apparatus such as copy machine comprises a document feeder for feeding the document and a document support for supporting the document. The document support can occupy any one of three positions; a first position where the document on the document support is kept away from the document feeder, a second position where the document on the document support is in contact with the document feeder, and a third position where the document is out of contact with the document feeder but closer to the document feeder than the document at the first position.

In another aspect of the invention, the automated document feeder includes means for setting an automatic start mode in which the document on the document support is fed therefrom when the detector has detected the document on the document support, a detector for detecting the document on the document support, and means for moving the document support from the first position to the third position when the automatic start mode has been set and then moving the document support from the third position to the second position when the document has been prepared on the document.

In another aspect of the invention, the automated document feeder is connected with an image forming apparatus. Also, the automated document feeder includes control means for moving the document support from the first position to the third position when a condition of an image forming by the image forming apparatus has been set and then moving the document support from the third position to the second position when the image forming apparatus has been instructed to start an image forming process. The condition may be a density or magnification of an image, the number of images to be reproduced or a sheet to which the image is formed in the image forming apparatus.

According to the invention, the document on the document support can be prepared at the third position where the supported document is out of contact with the document feeder but closer to the document feeder than the document at the first position before an actual document feeding is initiated. Therefore, a required time from an instruction of the automatic document feeding to the actual document feeding will be reduced. Also, even when the document support is at the third position, some of the documents set on the document support can be removed and additional document can be placed on the stack of documents. Further, when the document is removed from the document support, the document support occupies the first position a way from the feed roller, permitting the document to be placed easily on the document supply.

The present disclosure relates to subject matter contained in Japanese Patent Application (Tokkaihei) No. 9-74444, filed on Aug. 22, 1996, which is expressly incorporated herein by reference in its entirely.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

(I) General Description of Automated Document Feeder

Figure 1:
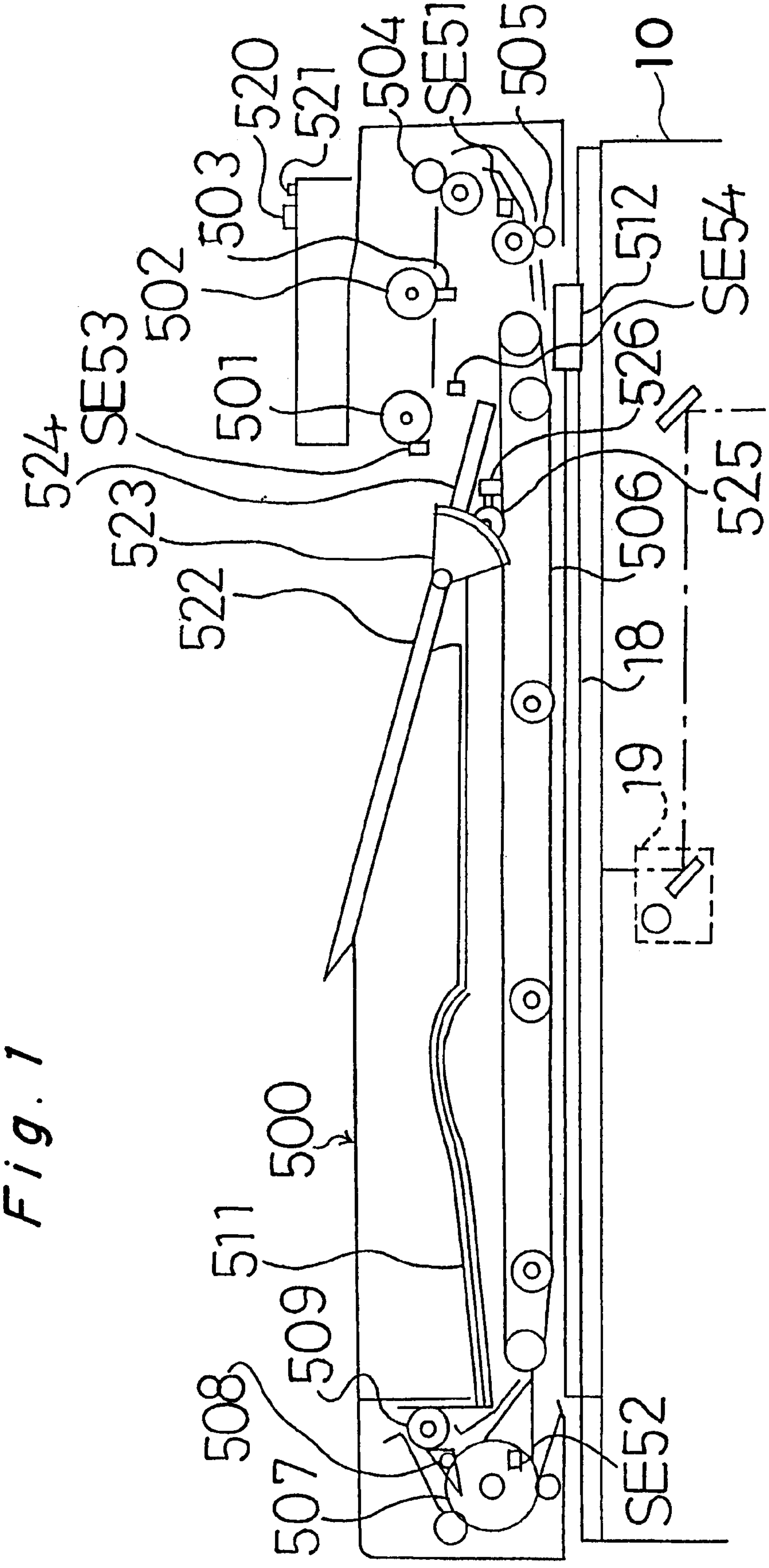
FIG. 1 is an side elevational view of an automated document feeder of the invention.

With reference to the drawings, particularly in FIG. 1, there is illustrated an automated document feeder (ADF) of the invention generally indicated by reference numeral 500. ADF 500 is disposed on a copy machine 10 to cover a transparent glass or platen 18 and includes a first document support or document tray 522 for supporting a stack of documents thereon, a first roller or feed roller 501 for feeding the document out of the document tray 522, a second roller 502 for further advancing the document fed by the feed roller 501, a friction pad 503 to cooperate with the second roller 502 to prevent a double feeding of the documents, a third roller or intermediate roller 504 for advancing the document fed from the second roller 502, a fourth roller or registration roller 505 for correcting a position of the document, a rotatably supported endless belt 506 for transporting the document along the platen 18 from left to right and vice versa, a reverse roller 507 for turning upside down the document discharged from the platen and then feeding the same toward the endless belt, a rotating nail 508 for directing the document to a selected direction, a fifth roller or discharge roller 509 for discharging the document from the endless belt 506 onto a catch tray 511, a scale 512 for positioning the document in a predetermined position on the platen 18, an automatic document feed mode (DF mode) key 520 for selecting an automatic document feed mode, a light-emitting diode (LED) 521 for indicating that the DF mode has been selected, a second document support 524 for supporting leading portion of the stack of documents together with the first document support 522, a gear 523 for rotating the second document support 524, a motor 525, a solenoid 526, sensors SE51 and SE52 for sensing the document, a sensor SE53 for detecting the document on the document tray 522 and an upper-limit sensor SE54 for determining whether the topmost document is in the uppermost position.

Figure 9:
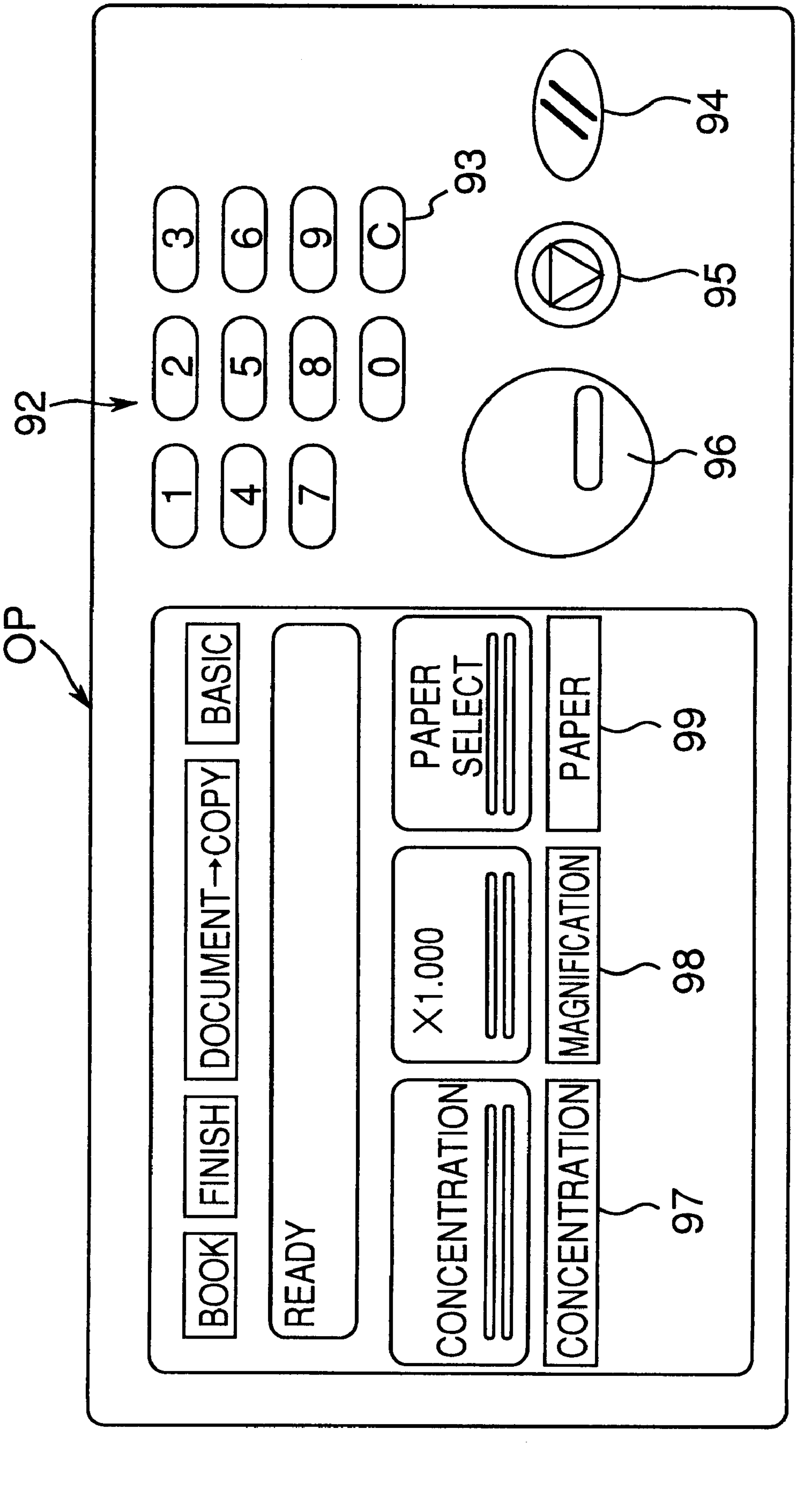
FIG. 9 is a plan view of an operation panel of the copy machine on which the automated document feeder of the invention is mounted.

ADF 500 is provided with two operation modes; a normal mode in which a document feed operation is started when a start key 96 (see FIG. 9) has been switched on and the DF mode in which the document feed operation is started when the documents have been prepared on the document tray 522. Initially, ADF 500 is set in the normal mode and the mode is changed to DF mode when the DF mode key has been switched on. The LED 521 is switched on if ADF 500 is in the DF mode.

When ADF 500 is operated, the topmost document with its image to be copied faced up is fed by the rotation of the feed roller 501. Disadvantageously, the documents underneath the topmost document can be fed by frictional forces between neighboring documents, however, these are prevented from being fed by the cooperation of the roller 502 and the friction pad 503. Further, the topmost document is transported by the intermediate roller 504 to the registration roller 505 where it is halted in a short period of time to correct its position. Then the document is advanced onto the platen 18 by the rotation of the belt 506 and, after a tailing edge of the document has passed through the scale 512, the belt 506 begins to rotate in the opposite direction, thereby bringing a tailing edge of the document into contact with the scale 512.

At this moment, a leading edge of the subsequent document, if exists, is held at the registration roller 505 where it waits until the preceding document on the platen 18 is discharged therefrom, realizing a rapid feeding of the subsequent document onto the platen 18.

Once the document is placed with its tailing edge touched with the scale 512 on the platen 18, the copy machine energizes an optical scanner 19 located under the platen 18 to read the image on a lower surface of the document. After completion of the image reading by the scanner 19 and a signal indicating that the reading has completed is transmitted from the copy machine to a central processing unit (CPU) 107 (see FIG. 2) mounted in ADF 500, the belt 506 is driven again to transport the document from right to left in the drawing toward the reverse roller 507.

Subsequently, the document fed from the platen 18 is guided by an upper surface of the nail 508 and then transported by the discharge roller 509 onto the catch tray 511 with its copied image faced up. Instead, the document may be transported by the rotation of the reverse roller 507 and then advanced onto the platen 18 again with its copied image faced up.

(II) Control Circuit

Figure 2:
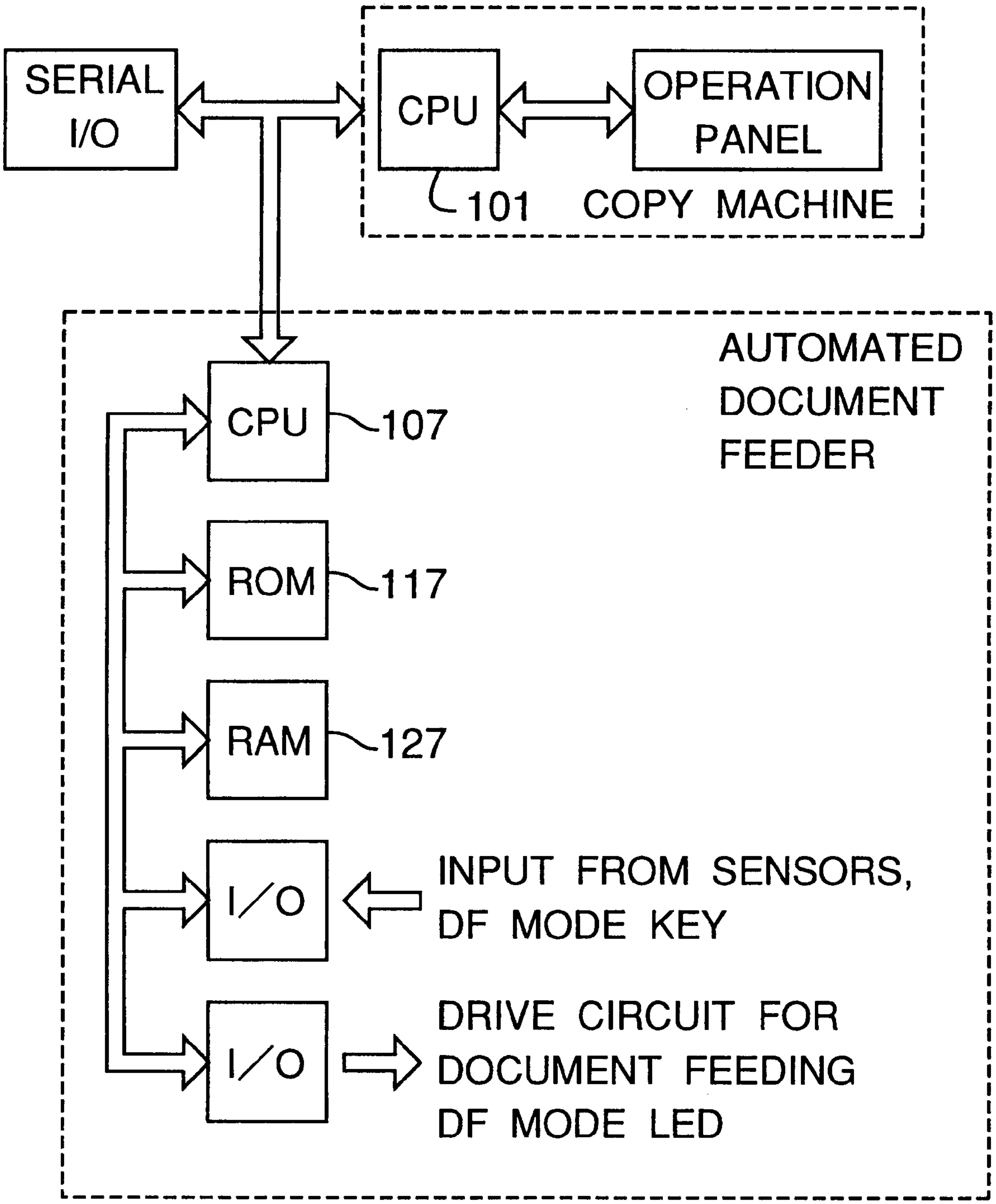
FIG. 2 is a circuit diagram of the automated document feeder in FIG. 1 and the associated copy machine.

FIG. 2 shows in part a control circuit of ADF and the associated portion of control circuit of the copy machine. CPU 107 for controlling ADF 500 is communicated through a serial I/O with the control circuit of the copy machine. The control circuit of the copy machine includes a serial I/O that communicates between an operation panel (OP) and a central processing unit (CPU) 101 for controlling a copying process of the copy machine. This permits the copy machine to provide ADF with signals for feeding, transporting and discharging of the documents.

Signals from the sensors SE51 to SE54 of ADF 500 and from DF mode key 520 are designed to be transmitted through I/O extended unit (not shown) into CPU 107. Also, signals to a drive circuit of ADF 500 and for switching DF mode LED 521 are designed to be fed out through I/O extended unit from CPU 107.

Figure 3:
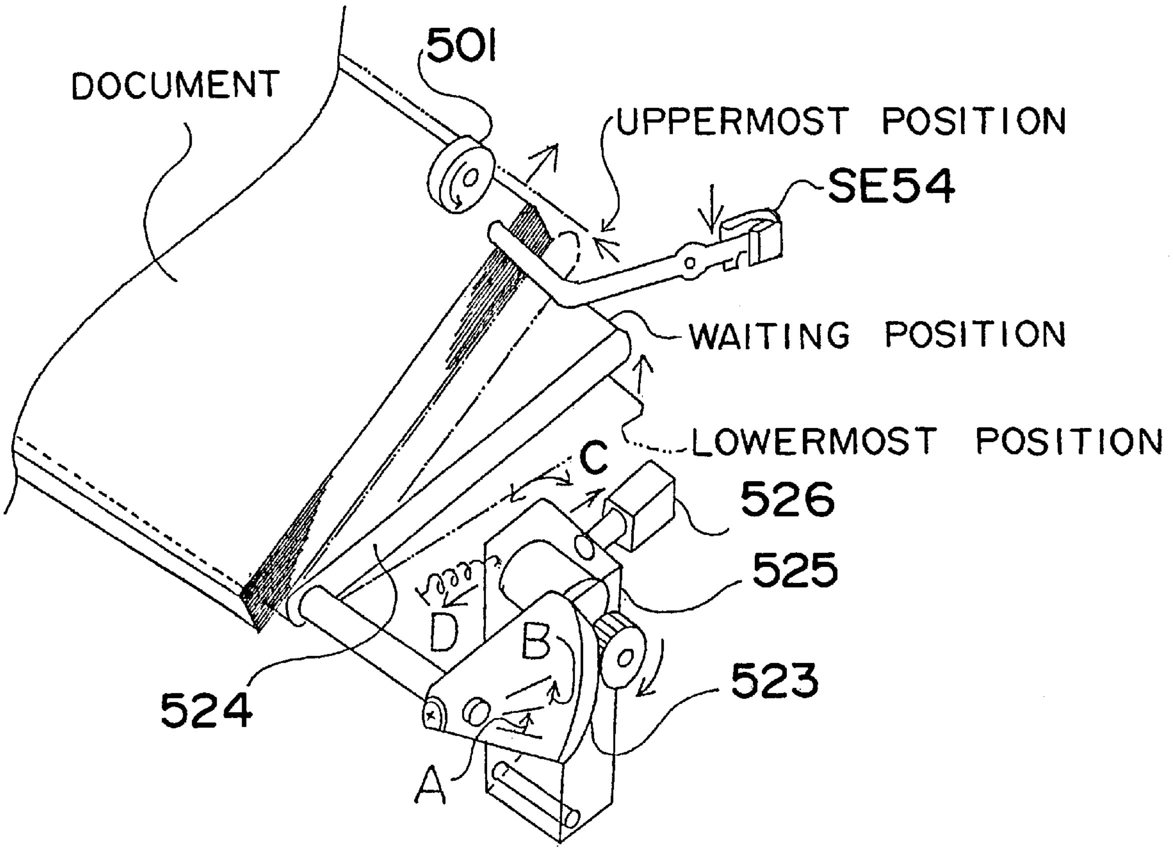
FIG. 3 is a partial perspective view of the automated document feeder of the invention.

(III) Rotating Mechanism (FIG. 3)

FIG. 3 shows a mechanism for rotating the document support 524 from a lowermost position to a waiting position and further from the waiting position to a feeding position where the document will be fed out, and vice versa. The lowermost position is illustrated by a two-dotted line in the drawing. The waiting position which is illustrated by a solid line is above the lowermost position, where no document can be fed out therefrom. The feeding position which is also illustrated by two-dotted line is the position where the topmost document on the tray is in contact with the feed roller 501, allowing the topmost document to be fed out therefrom.

An output shaft of the motor 525 is drivingly connected through a gear with the gear 523, so that, once the DF mode key 520 is switched on, the motor 525 rotates in a predetermined time and in turn to rotate the gear 523 by a certain angle indicated by an arrow A, thereby the document support 524 is raised to the waiting position for DF mode.

Next, after a predetermined time from the positioning of the document on the document tray 522, the motor 525 is energized to rotate the gear 523 until the upper limit sensor SE 54 is switched on to raise the document tray 522 up to the document feeding position, allowing the document feed operation to be initiated. A rotational angle of the 523 in this stage is illustrated by an arrow B.

If all the documents on the tray have been fed out from the document tray, the solenoid 526 is switched off for a while. This allows the motor 525 which is normally engaged with the gear 523 due to a biasing force of a spring to move in a direction indicated by an alphabet C, thereby disengaging the same from the gear 523. This permits the document support 524 to rotate by the force of gravity down to the lowermost position. This is achieved in a considerably short span of time and then the motor 525 is moved in the opposite direction indicated by an alphabet D by the biasing spring from the lowermost position, engaging again with the gear 523.

In the normal mode, the document support 524 normally occupies the lowermost position, however, once any key is switched on, as is the case that DF mode key 520 is switched on, the motor 525 rotates in a predetermined time to rotate the gear 523 by the angle indicated by the arrow A, allowing the document support 524 to be raised up to the DF mode position, i.e., waiting position.

If the start key 96 in the operation panel of the copy machine is switched on at this stage, the motor 525 is energized to rotate the gear 523 until the upper limit sensor SE54 is switched on. This moves the document support 524 up to the feeding position where the document is allowed to be fed out therefrom. The rotational angle of the gear 523 in this process is indicated by the arrow B. Then, the document feed operation is allowed to be initiated on the ground that the document tray 10 supports any document.

(IV) Operation of Document Support

Figure 4:
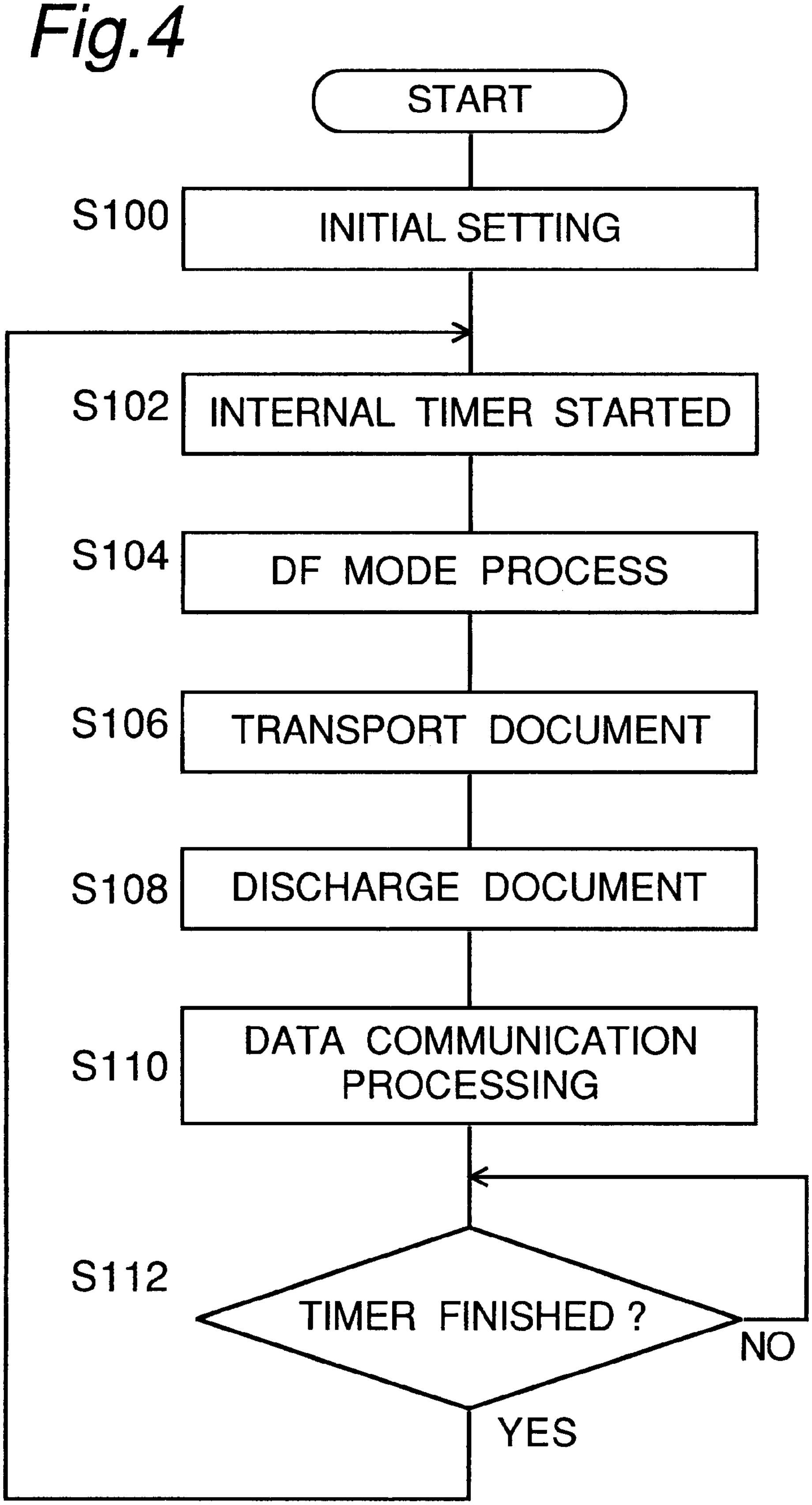
FIG. 4 is a flow-chart of a main routine processed in a central processing unit 107 in FIG. 2.
Figure 5:
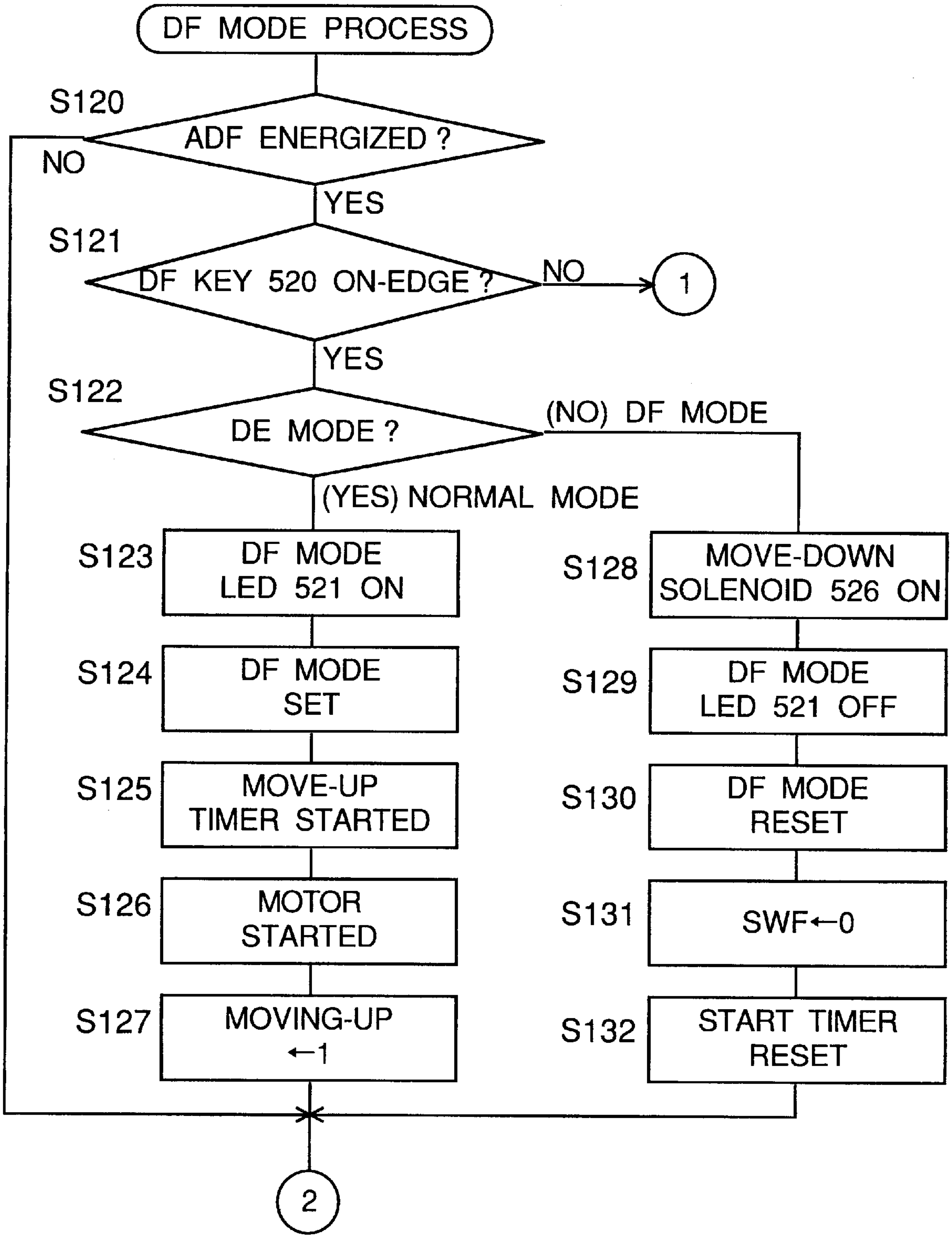
FIG. 5 shows in part a flow-chart of DF mode process at step S104 in FIG. 4.
Figure 6:
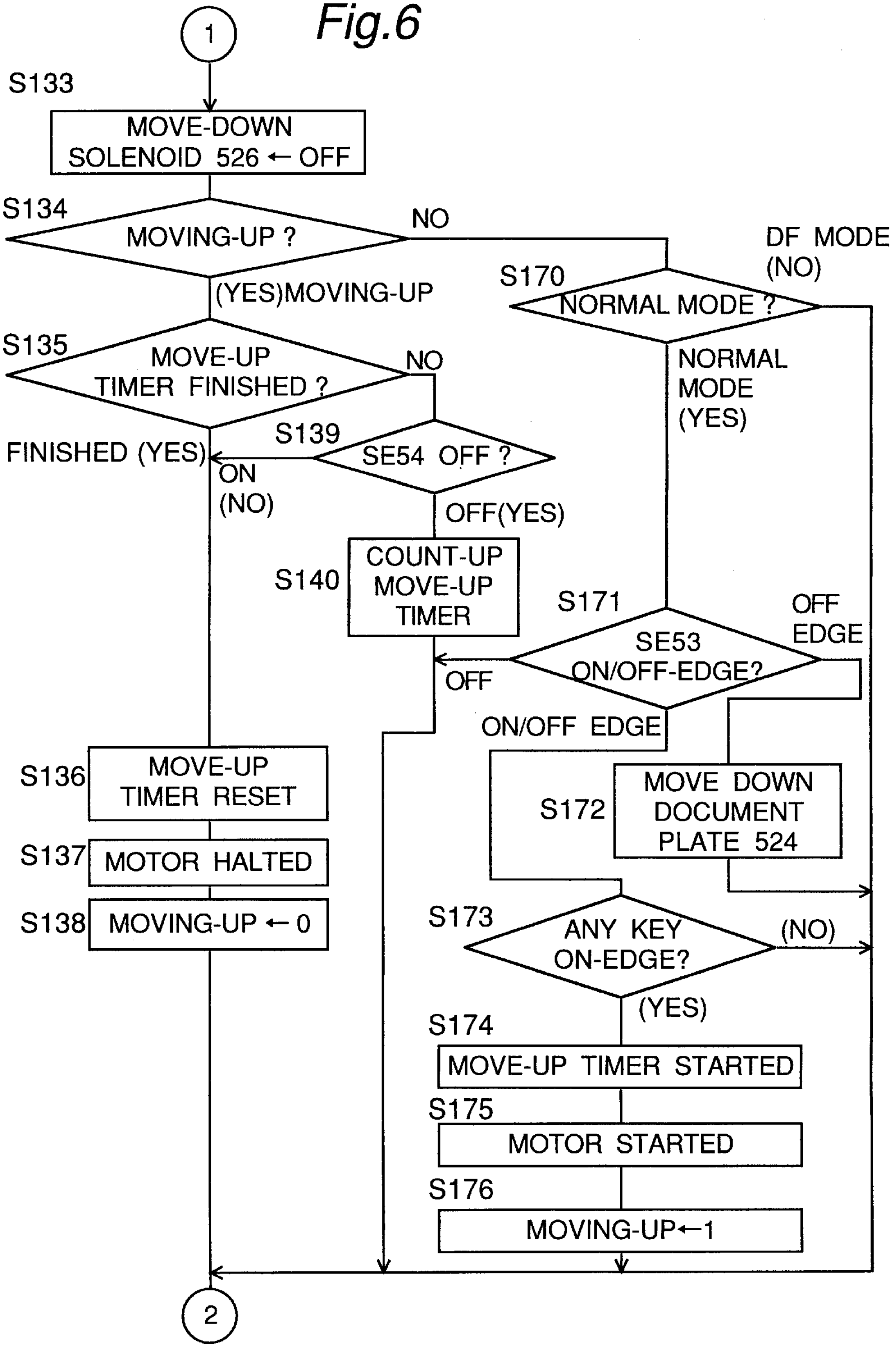
FIG. 6 also shows in part the flow-chart of DF mode process at step S104 in FIG. 4.
Figure 7:
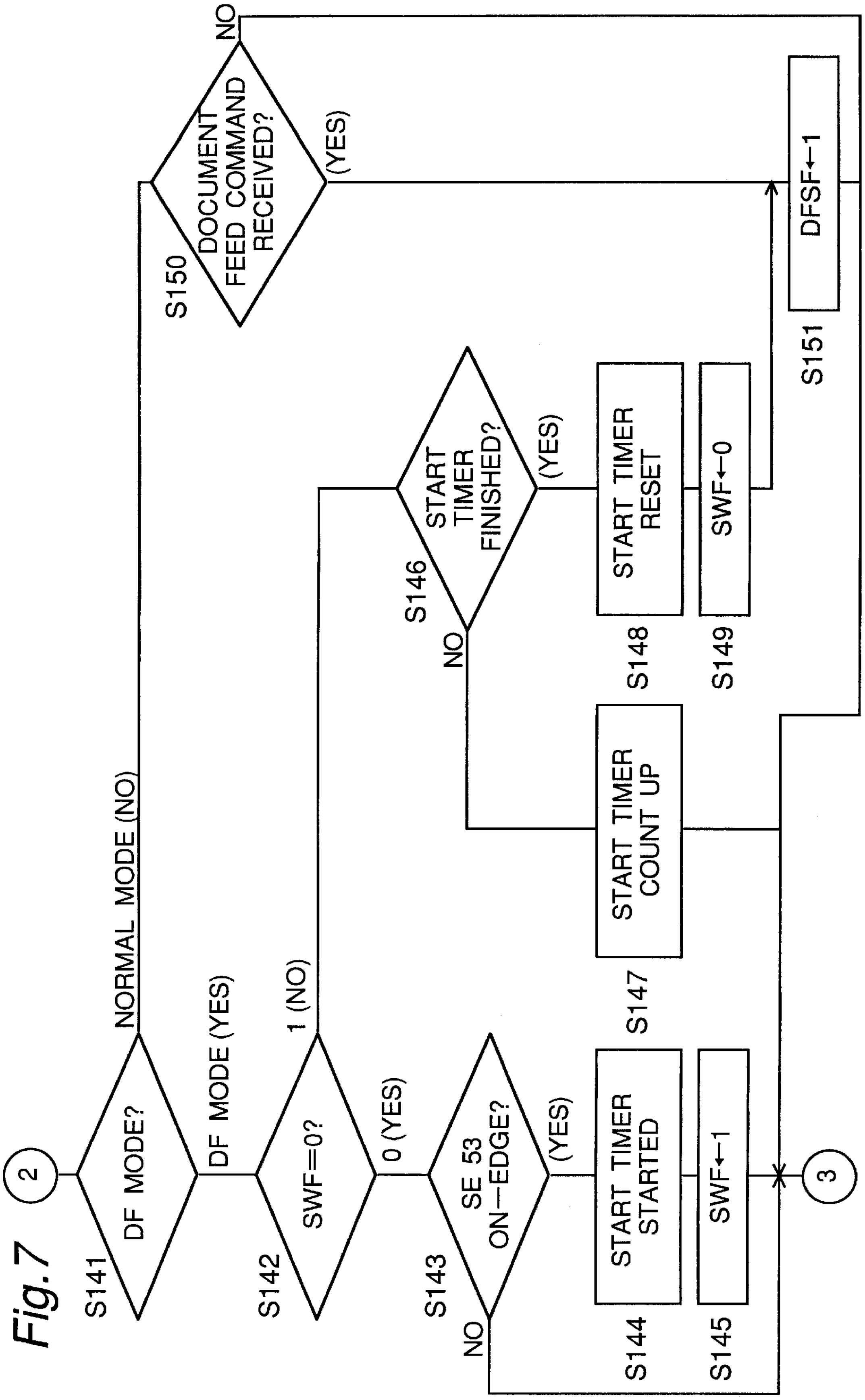
FIG. 7 further shows in part the flow-chart of DF mode process at step S104 in FIG. 4.
Figure 8:
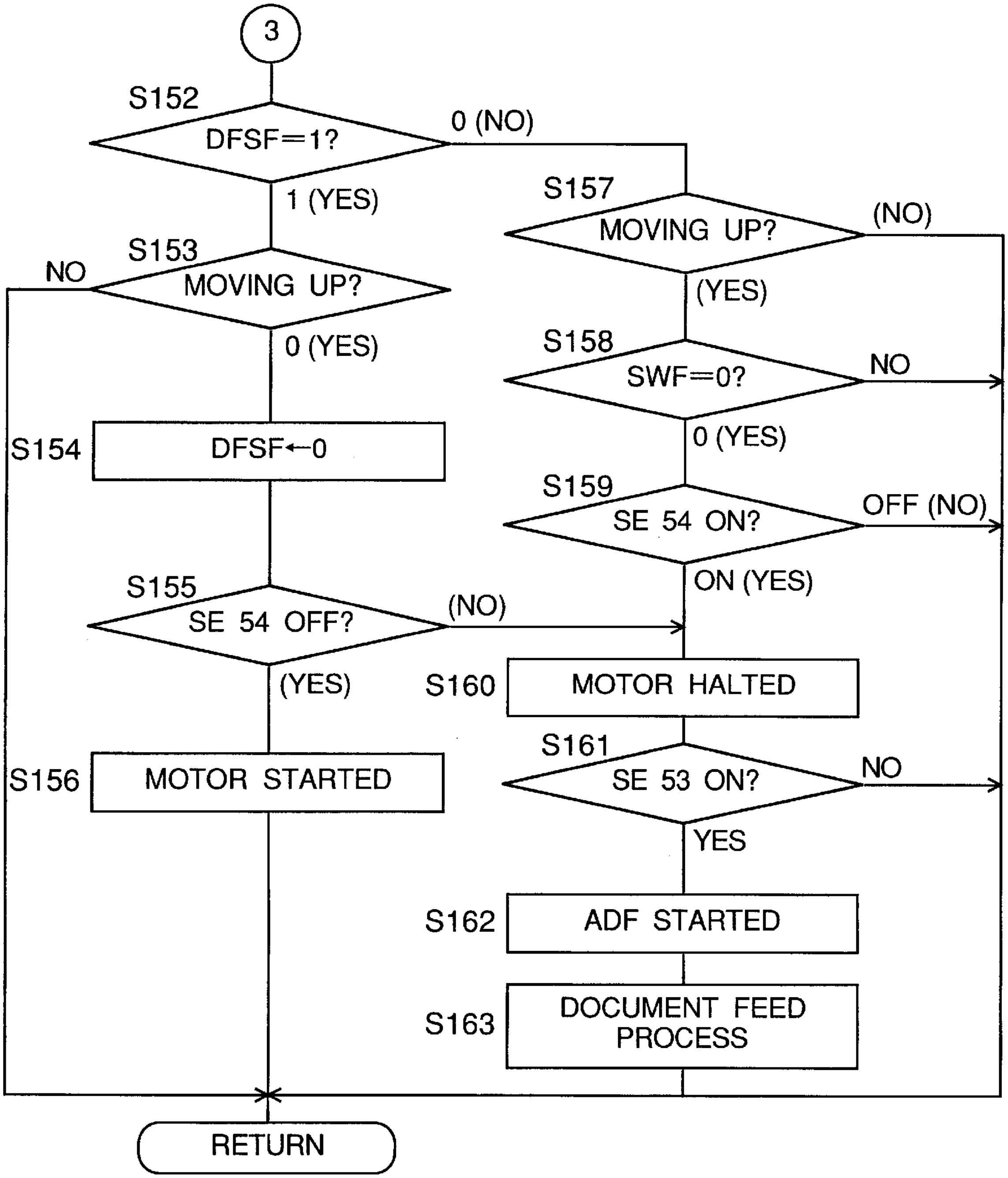
FIG. 8 furthermore shows in part the flow-chart of DF mode process at step S104 in FIG. 4.
Figure 10:
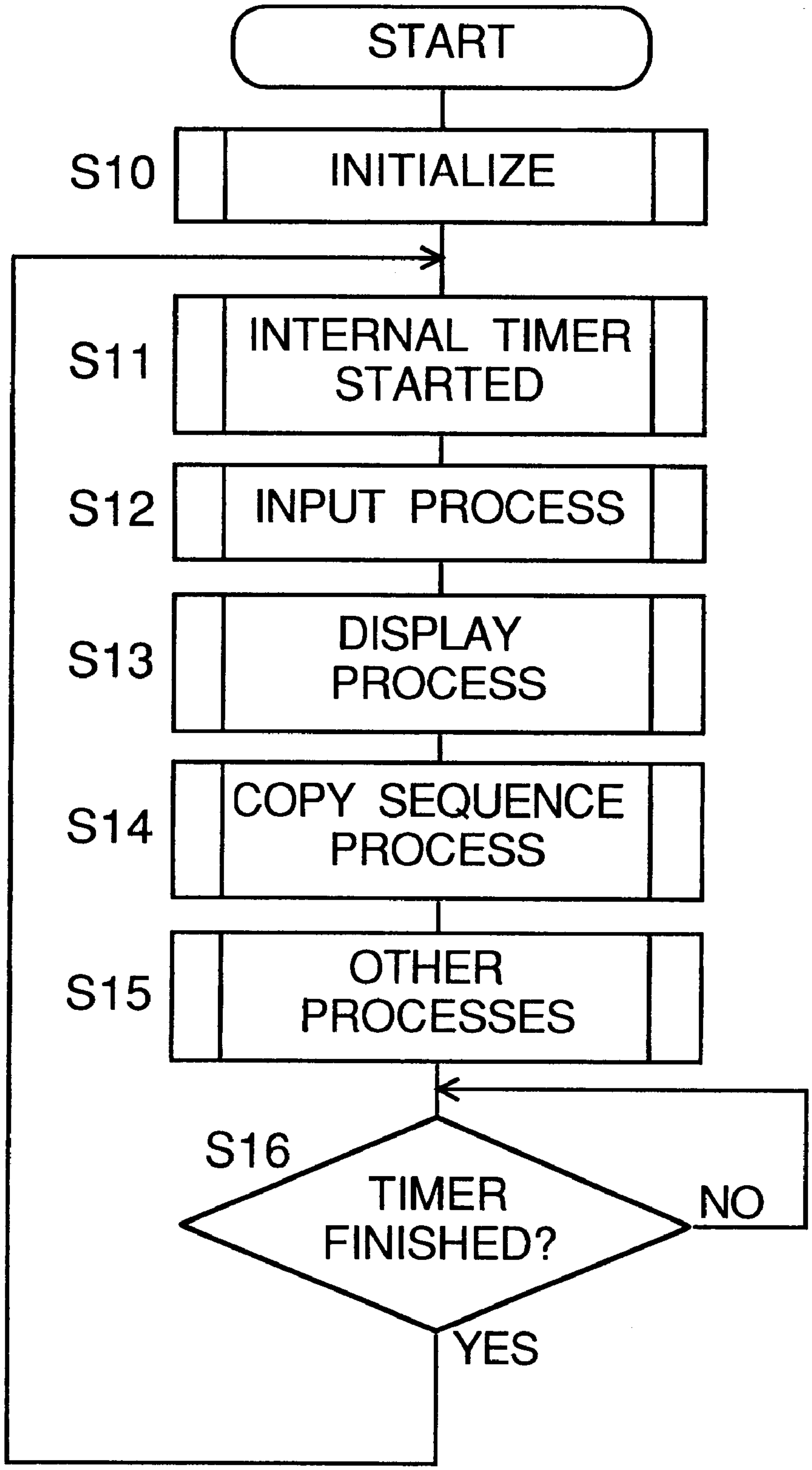
FIG. 10 is a flow-chart of the main routine processed in a central processing unit 101 in FIG. 2.

Discussions will be made to the operation of the document support together with processes made by CPU 107 of ADF 500 (see FIGS. 4 to 8), the operation panel of the copy machine (see FIG. 9) and processes made by CPU 101 of the copy machine (see FIGS. 10 and 11). It should be noted that the FIG. 4 shows a main routine of the processes, FIGS. 5 to 8 DF mode processes in FIG. 4 and FIG. 11 an input process in FIG. 10.

A. Main routine of CPU 107

Initially, an initial setting is performed at step S100 to initialize various variables and control flags. Then, an internal timer is started at step S102 to regulate a cycle time of the main routine.

At step S104, the DF mode is performed in which the topmost document on the document tray 522 is fed out therefrom, with preventing other documents underneath the topmost document from being fed out, to the registration roller 505 where the direction of the document is corrected, if necessary. DF mode will be discussed in detail below with reference to FIGS. 5 to 8.

At step S106, the document is fed out by the registration roller 505 at a suitable timing and then transported along the platen 18. Once the tailing edge of the document has passed the scale 512, the belt 506 is reversed to return the document to a reading position where the tailing edge of the document is in contact with the scale 512. Subsequently, if the copy machine outputs a signal indicating that the image of the document has been fully read by the copy machine, the belt 506 is re-rotated to transport the document toward the reverse roller 507.

At step S108, the document that has reached the reverse roller 507 is discharged onto the catch tray 511 or re-transported onto the platen 18 with its copied surface faced up. When being discharged onto the catch tray 511, the document is guided along the upper surface of the nail 508 and then forwarded to the catch tray 511 by the cooperation of the reverse roller 507 and the discharge roller 509. On the other hand, when being turned upside down and re-transported onto the platen 18, the document is guided along the lower surface of the nail 508 and then advanced by the rotation of the reverse roller 507 onto the platen 18.

At step S110, to communicate with CPU 101 of the copy machine through the serial I/O, a communication data processing is performed to provide a communication buffer with data processed at various processing unit not shown and to analyze the data in the receiving buffer and then transform them into a form that can be processed at associated processing units.

At step S112, it is determined whether the internal timer has been counted up, and if the internal timer is finished, the program returns to step S102 to repeat the above-mentioned processes.

B. DF mode Process (FIGS. 5 to 8)

When ADF 500 is not operated (i.e., at step S120, judged YES) and further DF mode key 520 is switched on and thereby an on-edge signal showing that DF mode key 520 has been changed from off-state to on-state is detected (i.e., at step S121, judged YES), the previous state of the DF mode key is detected at step S122. Then, depending upon the detected previous state, processes of steps S123 to S127 or of steps S128 to S132 are performed.

If the previous state is non-DF mode, i.e., normal mode (i.e., at step S122, judged YES), DF mode LED 521 is switched on at step S123 and DF mode is set at step S124. In addition, a timer for controlling a time during which the motor 525 will energized is started at step S125, and then the motor 525 starts driving at step S126. Next, "1" is provided for the corresponding flag to indicate that the motor 525 is driving at step S127 to move up the document support with documents from the lowermost position to the waiting position.

If, on the other hand, the pervious operation mode is DF mode (i.e., at step S122, judged NO), the solenoid 526 is switched on at step S128. Thereby, the output shaft of the motor 525 is disengaged from the gear 523, moving the document support 524 down to the lowermost position. Also, DF mode LED 521 is switched off at step S129, and DF mode is reset at step S130. Then, a start wait flag is changed to "0" at step S131, a start timer is reset at step S132 and the normal mode is started.

As described above, when the on-edge signal of DF mode key 520 is detected and thereby the DF mode is started or DF mode is canceled to start the normal mode, processes from step S141 are performed. At step S141, it is determined whether DF mode is set and, depending upon the result of the determination, processes from step S142 or step S150 are performed.

If it is determined that DF mode is set (i.e., at S141, judged YES), a judge is made to determine the start wait flag at step S142. When the process of step S142 is performed for the first time after the DF mode has been started, the start wait flag should be an initial state, i.e., "0". Therefore, the program flows to the step S143 in the next cycle.

At step S143, it is determined whether an on-edge of the sensor SE53 for detecting the document on the document tray has been detected. If no on-edge is detected (i.e., at step S143, judged NO), the program returns to the main routine to wait until the document is provided for the document tray, because program flows at following steps and determinations will be made as follows: step S152, NO; step S157, YES; step S158, YES; step S159, NO; step S120, YES; step S121, NO; steps S133 and S134, YES; step S135, NO; step S139,YES; steps S140 and S141, YES; S142 and S143.

Also, at step S135, it is determined that a predetermined lifting time has passed, i.e., judged YES, before the documents are set on the document support 524. Then, the program flows at steps S136 to S138 and it is determined at step S157 that the document support 524 is not moving up, i.e., judged NO. Then it is determined that the document support 524 is not moving up at step S134 and the current operation mode is not normal mode at step S170. That is, the program repeats those steps and waits for documents to be set on the document tray 522.

When the document is set on the document support 524 and document tray 522 and thereby the on-edge signal is transmitted from the document detecting sensor SE53, the start timer is started at step S144 and the start wait flag is changed to "1" at step S145. As a result, it is determined that the start wait flag is "1" at step S142 in the subsequent cycle and therefore the program flows into step S146. Also, the start timer is counted up at each subsequent cycles at step S147, and a determination is made at step S416 whether the timer has finished.

If the start timer that has started at step S144 is finished (i.e., at step 146, judged YES), the start timer is reset at step S148. Also, the start wait flag is changed to "0" at step S149, and then document feed start flag is changed to "1" at step S151.

When it is determined at step S152 that the document feed start flag is set to "1", processes subsequent to step S153 will be performed. Specifically, at step S153 it is determined whether the document is moving up. In most cases, the move-up process for lifting the document from the lowermost position to the waiting position would be finished at this state. Therefore, the program flows to step S154 where the document feed flag is changed to "0". If, however, it is determined that the document is moving up (i.e., at step S153, judged NO), the program waits until the move-up process is finished. Then, the program flows to step S154 where the document feed flag is changed to "0".

After the document flag is changed to "0" at step S154, the program flows to step S155. Then, the move-up timer is started at step S156 and the motor remains to raise documents on the document tray 522 up to the feeding position from the waiting position. When the documents reach the feeding position and thereby the upper limit sensor SE54 is switched on (i.e., at step S155, judged NO), the motor 525 is halted at step S160. In addition, if the document set detecting sensor SE53 detects the document (i.e., at step S161, judged YES), it is determined at step S162 that ADF 500 is in the operational state and the document feeding process is initiated at step S163. Thereby, the rollers 501, 502 and 504 start respective rotations.

As described above, when DF mode key 520 is switched on and DF mode is set, the document tray 522 is raised to the waiting position and, if the document is prepared on the document tray 522, the document tray 522 is slightly raised up to the feeding position where the documents can be fed from the document tray 522.

Discussions will be made to the normal mode. In the initial state, i.e., at step S10, CPU is set in the normal mode. Also, as described above, if DF mode is selected when the on-edge signal from DF mode key 520 is detected (i.e., at step S122, judged NO), the solenoid is switched on to move the document tray 524 down to the lowermost position at step S128. Then, the operation mode is changed from DF mode to the normal mode at steps S129 to S132 and the program flows to step S141. The solenoid 526 that has been switched on at step S128 to move down the document tray 522 will be switched off at step S133 in the next cycle, and therefore the output shaft of the motor 525 that is disengaged with the gear 523 will be re-engaged therewith immediately after the document tray has reached the lowermost position.

In the normal mode (i.e., at step 170, judged YES), if an off-edge signal of the sensor SE 53 showing that an output signal of the sensor SE53 has changed from on-state to off-state is detected at step S171, the process is performed at step S172 to move the document support 524 down to the lowermost position. Specifically, the output shaft of the motor 525 is disengaged from the gear 523 by switching on the solenoid 526 to descend the document support 524. The document support 524 occupies the lowermost position for a substantially short span of time. Then, the output shaft of the motor 525 is re-engaged with the gear 523 by switching off the solenoid 526.

Also, in the normal mode (i.e., at step S170, judged YES), if the documents are prepared on the document tray 522 and the sensor SE 53 outputs an on-edge signal showing that the output signal therefrom has changed from off-state to on-state at step S171 or if the sensor SE53 has detected the documents on the document tray 522 and as a result remains on-state (i.e., at step S171, judged ON), the program waits the input signal from any key on the operation panel of the copy machine and a command for feeding documents from CPU 101 of the copy machine. In other words, judges at steps S173 and S150 are repeated until either of the judge results changes from NO to YES. However, in the normal mode, if no document exists on the document tray 522 and therefore the sensor SE53 remains off-state (i.e., at step S171, judged OFF), the program flows to step S141.

Any key on the operation panel, for example, ten key 92, a density adjust key 97, magnification select key 98 or sheet select key 99, is switched on in the waiting state (i.e., at step A173, judged YES), a move-up timer is started at step S174, the motor 525 is energized at step S175, and a corresponding flag is set to "1" at step S176 to show that the document tray is being moving up. Thereby, as is the case described that DF mode is started by the on-edge signal of DF mode key 520, it is determined at step S134 in the subsequent cycle that the document tray is moving up and, as a result, the program flows to step S153. Thereby, the document tray 522 is raised from the lowermost position to the waiting position where it is held.

When the document tray 522 is in the waiting position and CPU 101 of the copy machine outputs a command for feeding documents (i.e., at step S150, judged YES), an associated flag is provided with "1" at step S151 for initiating document feeding. Then, the program flows from step S152 to step S153. At step S153, it is determined whether the document tray is moving up. At this stage, the move-up process for lifting the document tray from the lowermost position to the halfway position would have been completed. Then, the program flows to step S154 where the document feed flag is changed to "0".

After changing the document feed flag to "0" at step S154, the program flows to step S155. Thereby, the motor 525 is started at step S156. The motor 525 is kept driving until the stack of documents on the document tray 522 reaches the uppermost position where the documents are allowed to be fed out therefrom. If the upper limit sensor SE54 detects that documents has reached the uppermost position at step S155, the motor 525 is halted at step S160. Then, it is determined at step S162 that ADF 500 is in the operational state if any document exists on the document tray (i.e., at step S161, judged YES), the document feed process will be initiated at step S163 to drive rollers 501, 502 and 503.

As described above, in the normal mode, if any key is pushed on, the document tray 522 is raised to the waiting position close to the uppermost position where it stills. Subsequently, if the document feed command is transmitted from CPU 101 of the copy machine, the document tray 522 is further raised up to the uppermost position, allowing the document to be fed out therefrom.

C. Processes by CPU 101

Discussions will be made to processes at CPU 101 in the copy machine. CPU 101 controls both signals from the operation panel and the copy machine. In processes, at step S10, the program initializes various variables and flags. Then, an internal timer is started to control a time period of the process cycle.

Subsequently, at step S12, inputs from keys such as start key 96, ten key 92, clear key 93, stop key95 and panel reset key 94 and from an input port not shown are processed as described below. Further, at step S13, signals for displaying information on LCD panel and for an output port are processed.

At step S14, a process for copying operation including a copy sequence control is performed. Then, at step S15, other processes are performed in which, for example, a communication data process is performed for providing a transmission buffer with data processed at various units and for analyzing data from a receiving buffer and then transforming the data into another data capable of being processed at various processing units. Subsequently, at step S16, the program waits until the internal time started at step S11 is finished and, if the internal timer has finished (i.e., at step S16, judged YES), the program returns to step S11 to repeat the above described processes.

Figure 11:
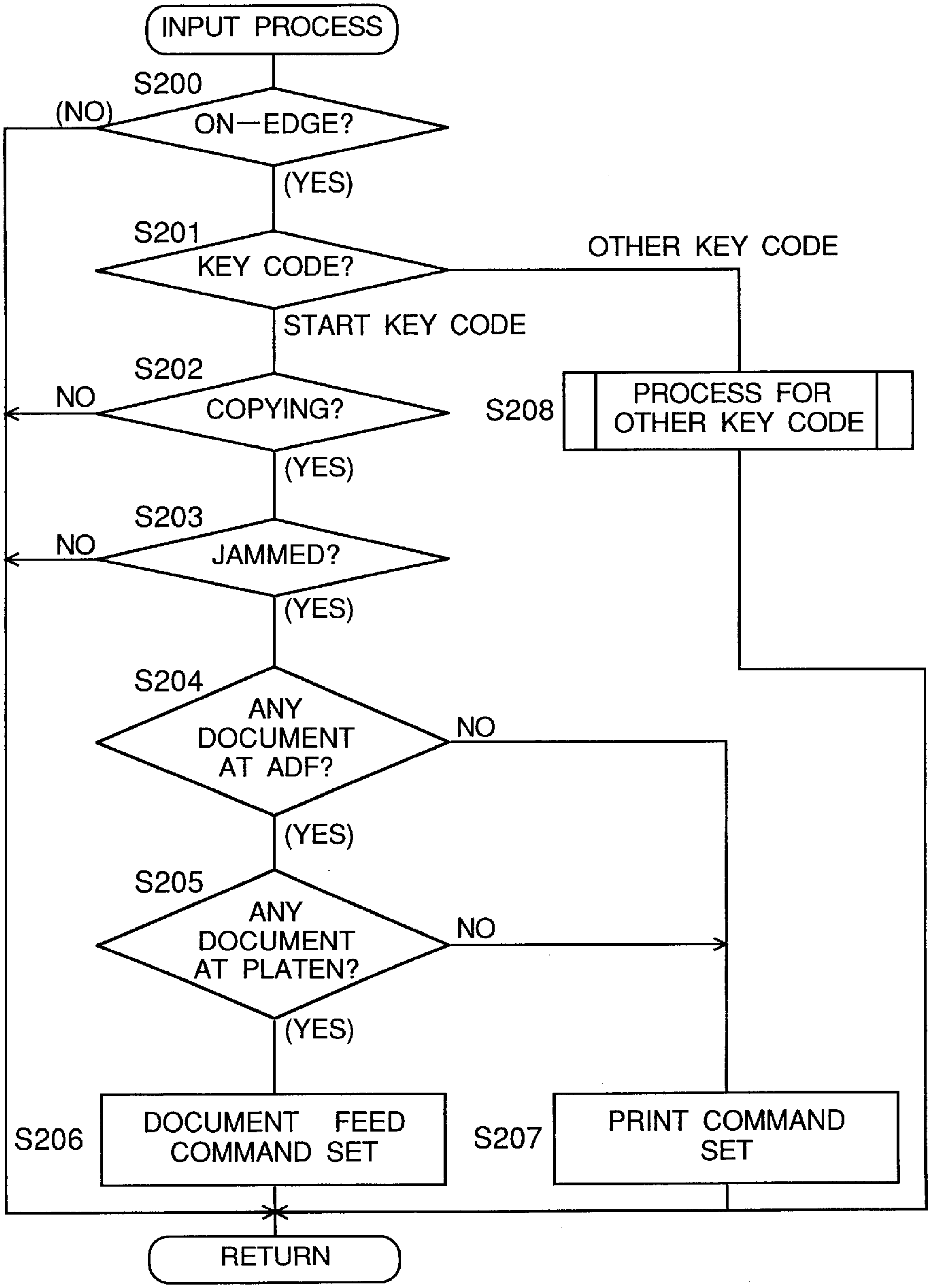
FIG. 11 is a flow-chart of the input process in FIG. 10.

In the input process at step S12, processes shown in FIG. 11 are performed. Initially, it is determined at step S200 whether any key on the panel has been pushed and the corresponding on-edge signal has been transmitted in. If the on-edge signal is detected (i.e., at step S200, judged YES), a key code of the pushed key is determined at step S201.

If the on-edge signal associated with keys other than start key 96 is detected at step S201, the program flows to step S208 where a certain process that corresponds to the key code is performed. Also, in this process, the on-edge signal which is determined at step S173 is transmitted. Detail description of the pr o cesses at step S208 is omitted herein.

At step S201, if the on-edge signal of the start key 96 is detected, the program flows to step S202 and the subsequent steps. At these steps, if it is determined that the copy machine is not in the operational state (at step S202, judged YES), no jam is occurred (i.e., at step S203, judged YES), one or more documents are stacked on the document tray 522 of ADF 500 (at step S204, judged YES) and no document exists on the platen 18 (at step S205, judged YES), the document feed command is set at step S206 in the transmitting buffer. As a result, a determination is made at step S150 in FIG. 7 that the document feed command has received and therefore the document tray 522 is lifted from the waiting position to the uppermost position and then ADF 500 is energized to feed document.

If the copy machine is in the operational state (i.e., at step D202, judged NO) and/or the jam is occurred in the document passage (i.e., at step S203, judged NO), no document is fed out from the document tray even when the start key has been pushed. Also, if it is determined that the copy machine is not in the operational state (i.e., at step S202, judged YES), no jam is occurred (i.e., at step S203, judged YES) and no document exists on the document tray 522 of ADF 500 (i.e., at step S204, judged NO), or one or more documents remain on the document tray 522 and another document exists on the platen 18 (i.e., at step S205, judged NO), the print command is set in the transmitting buffer at step S207, thereby driving the copy machine to reproduce the image of the document.

Although in the previous normal mode the process for raising the document tray 522 up to the halfway position is started on the ground that any key in the operation panel is pushed (Step S173,YES), the document tray 522 may be raised a certain time period after the documents have been stacked thereon.

Although the present invention has been fully described by way of examples with reference to the accompanying drawings, it is to be noted that various changes and modifications will be apparent to those skill in the art. Therefore, unless otherwise such changes and modifications depart from the scope of the present invention, they should be construed as being included thereto.

What is claimed is:

1. An automated document feeder for automatically feeding a document, comprising:

a document feeder for feeding the document;

a document support for supporting the document, the document support being set at any one of three positions, a first position where the document on the document support is kept away from the document feeder, a second position where the document on the document support is in contact with the document feeder, and a third position where the document is out of contact with the document feeder but closer to the document feeder than the document at the first position.

2. An automated document feeder as claimed in claim 1, further comprising:

a detector for detecting the document on the document support;

means for setting an automatic start mode in which the document on the document support is fed there from when the detector has detected the document on the document support; and means for moving the document support from the first position to the third position when the automatic start mode has been set and then moving the document support from the third position to the second position when the document has been prepared on the document.

3. An automated document feeder claimed in claim 1, wherein the automated document feeder is connected with an image forming apparatus, and the automated document feeder further comprises control means for moving the document support from the first position to the third position when a condition of an image forming by the image forming apparatus has been set and then moving the document support from the third position to the second position when the image forming apparatus has been instructed to start an image forming process.

4. An automated document feeder claimed in claim 3 wherein the condition is a density of an image to be formed by the image forming apparatus.

5. An automated document feeder claimed in claim 3 wherein the condition is a magnification of an image to be reproduced by the image forming apparatus.

6. An automated document feeder claimed in claim 3 wherein the condition is the number of images to be formed in the image forming apparatus.

7. An automated document feeder claimed in claim 3 wherein the condition is a sheet to which an image is formed in the image forming apparatus.

8. An image forming apparatus with an automated document feeder, the automated document feeder including a document feeder for feeding the document;

a document support for supporting the document, the document support being set at any one of three positions, a first position where the document on the document support is kept away from the document feeder, a second position where the document on the document support is in contact with the document feeder, and a third position where the document is out of contact with the document feeder but closer to the document feeder than the document at the first position;

the image forming apparatus further including means for reading an image bore on the document fed from the automated document feeder.

9. An image forming apparatus claimed in claim 8, further comprising:

a detector for detecting the document on the document support;

means for setting an automatic start mode in which the document on the document support is fed therefrom when the detector has detected the document on the document support; and means for moving the document support from the first position to the third position when the automatic start mode has been set and then moving the document support from the third position to the second position when the document has been prepared on the document.

10. An image forming apparatus claimed in claim 8, wherein the automated document feeder is connected with the image forming apparatus, and the automated document feeder further comprises control means for moving the document support from the first position to the third position when a condition of an image forming by the image forming apparatus has been set and then moving the document support from the third position to the second position when the image forming apparatus has been instructed to start an image forming process.

11. An image forming apparatus claimed in claim 10 wherein the condition is a density of an image to be formed by the image forming apparatus.

12. An image forming apparatus claimed in claim 10 wherein the condition is a magnification of an image to be reproduced by the image forming apparatus.

13. An image forming apparatus claimed in claim 10 wherein the condition is the number of images to be formed in the image forming apparatus.

14. An image forming apparatus claimed in claim 10 wherein the condition is a sheet to which an image is formed in the image forming apparatus.

15. An image forming apparatus with an automated document feeder, the automated document feeder including a document feeder for feeding the document;

a document support for supporting the document, the document support being set at any one of three positions, a first position where the document on the document support is kept away from the document feeder, a second position where the document on the document support is in contact with the document feeder, and a third position where the document is out of contact with the document feeder but closer to the document feeder than the document at the first position;

the image forming apparatus further including means for reading an image bore on the document fed from the automated document feeder; and means for reproducing an image of the document.

16. An image forming apparatus claimed in claim 15, further comprising:

a detector for detecting the document on the document support;

means for setting an automatic start mode in which the document on the document support is fed therefrom when the detector has detected the document on the document support; and means for moving the document support from the first position to the third position when the automatic start mode has been set and then moving the document support from the third position to the second position when the document has been prepared on the document.

17. An image forming apparatus claimed in claim 15, further comprising:

means for setting a condition of an image forming in the image forming apparatus;

means for initiating the image forming in the image forming apparatus; and control means for moving the document support from the first position to the third position when a condition of an image forming by the image forming apparatus has been set and then moving the document support from the third position to the second position when the image forming apparatus has been instructed to start an image forming process.

18. An image forming apparatus claimed in claim 17 wherein the condition is a density of an image to be formed by the image forming apparatus.

19. An image forming apparatus claimed in claim 17 wherein the condition is a magnification of an image to be reproduced by the image forming apparatus.

20. An image forming apparatus claimed in claim 17 wherein the condition is the number of images to be formed in the image forming apparatus.

21. An image forming apparatus claimed in claim 17 wherein the condition is a sheet to which an image is formed in the image forming apparatus.

* * * * *